United States Patent
Kim

(10) Patent No.: US 6,236,628 B1
(45) Date of Patent: May 22, 2001

(54) READ CHANNEL CIRCUIT FOR OPTICAL DISK REPRODUCING APPARATUS

(75) Inventor: Chun-Sup Kim, Kyonggi-do (KR)

(73) Assignee: SamSung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/289,987

(22) Filed: Apr. 13, 1999

(30) Foreign Application Priority Data

Apr. 13, 1998 (KR) .................................................. 98-13092

(51) Int. Cl.[7] .......................................................... G11B 7/00
(52) U.S. Cl. ...................................... 369/44.41; 369/44.34
(58) Field of Search .............................. 369/44.41, 44.34, 369/124.05, 124.14

(56) References Cited

U.S. PATENT DOCUMENTS 5,828,954 * 10/1998 Wang ..................................... 455/265

* cited by examiner

*Primary Examiner*—Nabil Hindi
(74) *Attorney, Agent, or Firm*—Sughrue, Mion, Zinn, Macpeak & Seas, PLLC

(57) ABSTRACT

A read channel circuit of an optical disk reproducing apparatus is adapted to provide stability in servo control and reduce power consumption by revising the offset component of the circuit components after application of reference signals and then the offset component caused by pit depth resulting from signals read out in reproducing a data from an optical disk. The read channel circuit includes: a data converting section for amplifying signals input via different channels and converting them to digital data. A data reproducing section is provided for summing and waveform-equalizing the digital signals, detecting the phase difference between the waveform-equalized signals and reference sampling points, and generating a sampling clock frequency which is provided to the data converting section for compensating for the phase difference. A servo error signal detecting signal is provided for delaying the signals input from the data converting section by phases specified by the offset revision control signal and the pit depth revision control signal, summing the delayed signals into a plurality of signals, and generating the tracking error signals based on the comparison of phase differences between the summed signals.

8 Claims, 4 Drawing Sheets

READ CHANNEL CIRCUIT FOR OPTICAL DISK REPRODUCING APPARATUS

BACKGROUND OF THE INVENTION

1. Field of the Invention

The present invention relates to a read channel circuit of an optical disk reproducing apparatus. More particularly, the present invention relates to a read channel circuit of an optical disk reproducing apparatus which is adapted to provide stability in reproducing recorded data and performing servo control.

2. Description of the Related Art

In recent years, the development of new optical recording media and data compression techniques has made it possible to achieve enormous data storage capacity using an optical disk reproducing apparatus. The optical disk reproducing apparatus may be divided into mechanical and circuit components. Examples of the mechanical components include an optical disk, a spindle motor for rotating the optical disk, a pickup for recorded data, and driver motors for driving the pickup. Examples of the circuit components include a read channel circuit that converts signals read through the pickup to a digital data via amplifying and waveform-equalizing means before they are EFM demodulated and generates servo error signals from the read signals; a digital signal processor circuit for processing the digitalized data and restoring it to the original data as they were before modulation; an interface circuit for interfacing a data between a host computer and the optical disk reproducing apparatus; a servo processor for revising the servo error signals to control servo of the mechanical components; and a main processor or microcomputer for entirely controlling the optical disk reproducing apparatus. However, the optical disk reproducing apparatus requires revision of the offset components of mechanical and circuit components in order to secure stability of signal reproduction and servo control. In the following description, the offset resulting from the mechanical components (e.g., offset of pickup, pit depth difference) is referred to as "pit depth offset" and the revision of this offset is referred to as "offset revision". On the other hand, the offset caused by the circuit components is simply called "offset", with its revision being "offset revision".

Next, the construction and operation of a read channel circuit employed in a general optical disk reproducing apparatus to revise the prescribed pit depth and offset are explained in detail with reference to FIGS. 1 and 2.

FIG. 1 is an exemplary diagram of a read channel circuit, in which the signals read out through the pickup of an optical disk reproducing apparatus pass through the read channel circuit before they are EFM demodulated. FIG. 2 is an exemplary diagram illustrating another type of such a read channel circuit. Referring to FIG. 1, the signals read by four-division photodiodes (hereafter, referred to as "PDs") A to D are amplified as voltages at I/V amplifiers 102, 104, 106 and 108 and sent to a data reproducing section 200, a tracking error signal detecting section 300 and a focusing error signal detecting section 400.

The read signals A to D applied to the data reproducing section 200 are gain-controlled and summed by an AGC (Automatic Gain Control) & sum circuit 202, and output as an RF signal A+B+C+D. This RF signal is equalized by a waveform equalizer circuit 204 and shaped as a rectangular wave pulse via a data slice circuit 206. The EFM signal digitalized by the data slice circuit 206 is demodulated into the data as they were before EFM modulation at a DSP (Digital Signal Processor) 208, and output to a host computer via an interface (not shown).

On the other hand, the read signals A to D applied to the tracking error signal detecting section 300 is delay-adjusted by delay circuits 310, 312, 314 and 316, which are connected to the outputs of buffers 302, 304, 306 and 308, respectively, and input to adders 318 and 320. Delay control signals DCS(1) and DCS(2) are input to the delay circuits 310, 312, 314 and 316 to be used for pit depth revision. Under these signals, the read signals A to D are tuned and output. DCS(1) and DCS(2), although not shown, can be output either from the servo processor or from the main processor.

The read signals A and C output from the delay circuits 310 and 314 are summed and amplified at an AGC & sum circuit 318 and compared with a reference voltage level $V_{ref}$ at a level comparator 322, which outputs the comparison result as a digital data. Level comparator 324 also compares the sum B+D of read signals B and D with the reference voltage level $V_{ref}$, outputting the result as digital data. These digital data output from the two level comparators 322 and 324 are delay-controlled under DCS(3) and DCS(4) at first and second delay circuits 326 and 328, respectively, and supplied to a phase detector 330. DCS(3) and DCS(4) denote delay control signals used to revise the offset component of the circuit components. The delay control signals can also be output either from the servo processor or from the main processor. The phase detector 330 outputs a voltage signal based on the phase difference between signals A+C and B+D. The output voltage signal is filtered at an LPF (Low Pass Filter) 332 and output as a tracking error signal (hereinafter, referred to as "TES"). As well as a focusing error signal (hereinafter, referred to as "FES") that will be described later, TES is input to the servo processor (not shown) and used to perform a servo control.

Each of the read signals A to D applied to the focusing error signal detector 400 is amplified and summed at sum & amplifiers 402 and 404, and output as signals A+C and B+D, which signals are compared by a level comparator 406. The data according to the comparison result is filtered at LPF 408 and output as a focusing error signal.

In an optical disk reproducing apparatus employing the above-described read channel circuit, distortion of signals due to analog signal processing increases with higher processing rate. Especially, the waveform equalizer circuit 204 that processes analog signals is more variable in characteristic as the processing rate becomes higher, so that stability of the output signal is hard to secure, with a consequence of difficulty in an aspect of design. Higher processing rate also gives a rise to an increase in the power consumption of analog signal processing devices. Another problem with such an optical disk reproducing apparatus is that there is much difficulty in controlling delay characteristic for revising pit depth and the offset component of the circuit components, as a result of which precise servo control is impossible to achieve.

Next, the construction and operation of another read channel circuit are explained in detail with reference to FIG. 2. The tracking error signal detecting section 300 and the focusing error signal detecting section 400 of the lead channel circuit shown in FIG. 2 are same in construction as shown in FIG. 1, and their constructions and functions will be omitted in the following description.

In the construction and operation of data reproducing section 200, the read signals picked-up by four-division PDs A to D are amplified as voltages at I/V amplifiers 102, 104, 106 and 108 and sent to the AGC & sum circuit 202 of the data reproducing section 200. Those read signals are gain-controlled and summed at the AGC & sum circuit 202 and removed of noises at an anti-aliasing filter 210. The read signals are sampled by a sampling clock SCLK and output as a digital data, which undergoes waveform equalization and low pass filtration at a digital waveform equalizer circuit/LPF 214 and is supplied to a timing recovery circuit 218 and a DSP 216. The timing recovery circuit 218 generates a control voltage (as a digital data in case of digital phase-locked loop) based on the difference between the read signal output from the waveform equalizer circuit/LPF 214 and a reference sampling point. A voltage-controlled oscillator (VCO) 220 generates a sampling clock frequency SCLK whose frequency and phase are varied in correspondence to the level of the control voltage input from the timing recovery circuit 218.

In the optical disk reproducing apparatus with the read channel circuit shown in FIG. 2, use of a waveform equalizer circuit to process digital signals provides much stability for data reproduction characteristic as compared with the read channel circuit shown in FIG. 1. However, the higher processing rate results in more power consumption by analog signal processing devices used in the tracking and focusing error signal detecting sections 300 and 400. There is also a need to pay attention to the circuit construction and arrangement for servo control, since a digital noise may be caused much in controlling delay characteristic to revise pit depth and offset of circuit components.

SUMMARY OF THE INVENTION

Accordingly, an object of the present invention is to provide a read channel circuit of an optical disk reproducing apparatus which is adapted to provide stability in performing servo control by detecting servo error signals required to revise pit depth and offset of the circuit components by way of digital signal processing.

Another object of the present invention is to provide an optical disk reproducing apparatus that reduces power consumption of signal processing devices in reproducing a recorded data and performing servo control.

Still another object of the present invention is to provide a read channel circuit which is adapted to eliminate a need of read channels in detection of a phase difference by use of four-division photodiodes.

To achieve the above object of the present invention, there is provided a read channel circuit of an optical disk reproducing apparatus which has a servo processor for generating an offset revision control signal and a pit depth revision control signal used to minimize tracking error signals, the read channel circuit including: a data converting section for amplifying signals input through different channels and converting them to digital data; a data reproducing section for summing and waveform-equalizing the signals converted to digital data, detecting the phase difference between the waveform-equalized signals and reference sampling points, and generating a sampling clock frequency for compensating for the phase difference, the sampling clock frequency being output to the data converting section; and a servo error signal detecting signal for delaying the signals input from the data converting section as much as the phases specified by the offset revision control signal and the pit depth revision control signal, summing the delayed signals into a plurality of signals, and generating the tracking error signals based on the comparison of phase differences between the summed signals.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Figure 1:
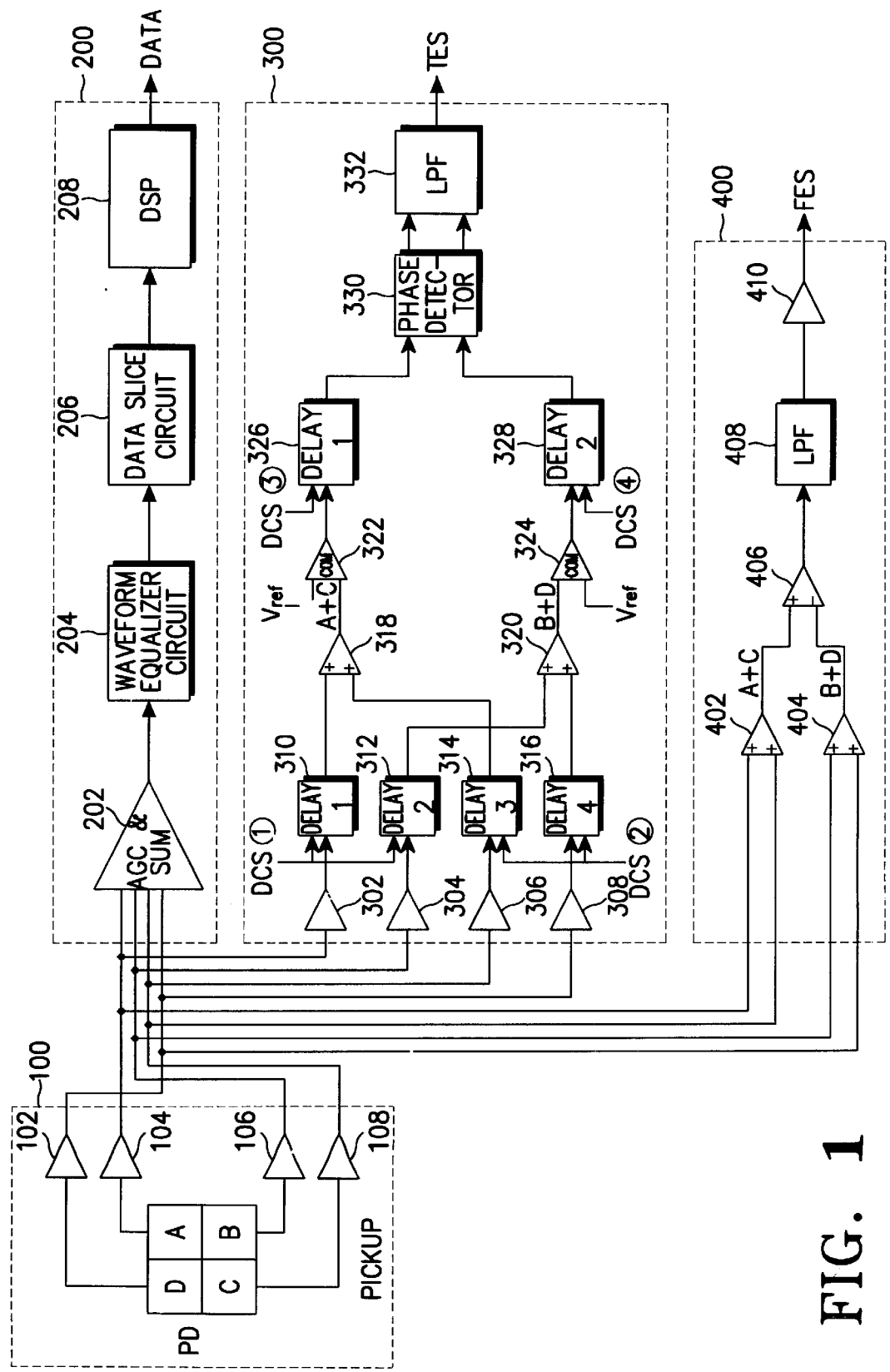
FIG. 1 is an exemplary view of a read channel circuit, in which the signals read out through a pickup of an optical disk reproducing apparatus pass through the read channel circuit before they are EFM demodulated.
Figure 2:
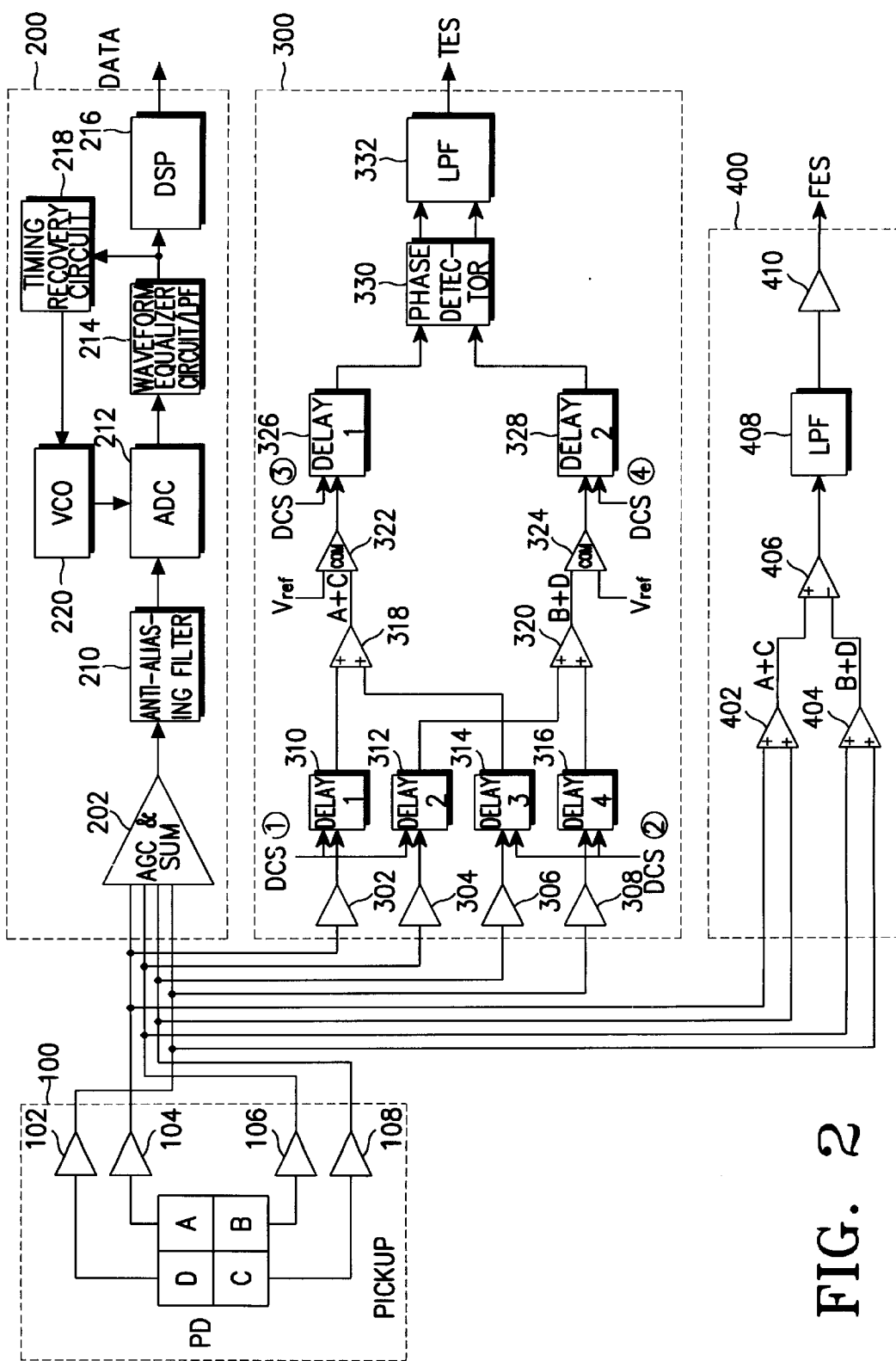
FIG. 2 is an exemplary view of another read channel circuit, in which the signals read out through a pickup of an optical disk reproducing apparatus pass through the read channel circuit before they are EFM demodulated.

The preferred embodiments of the present invention will now be described in detail with reference to the accompanying drawings, in which like reference numerals represent the same or similar elements.

Figure 3:
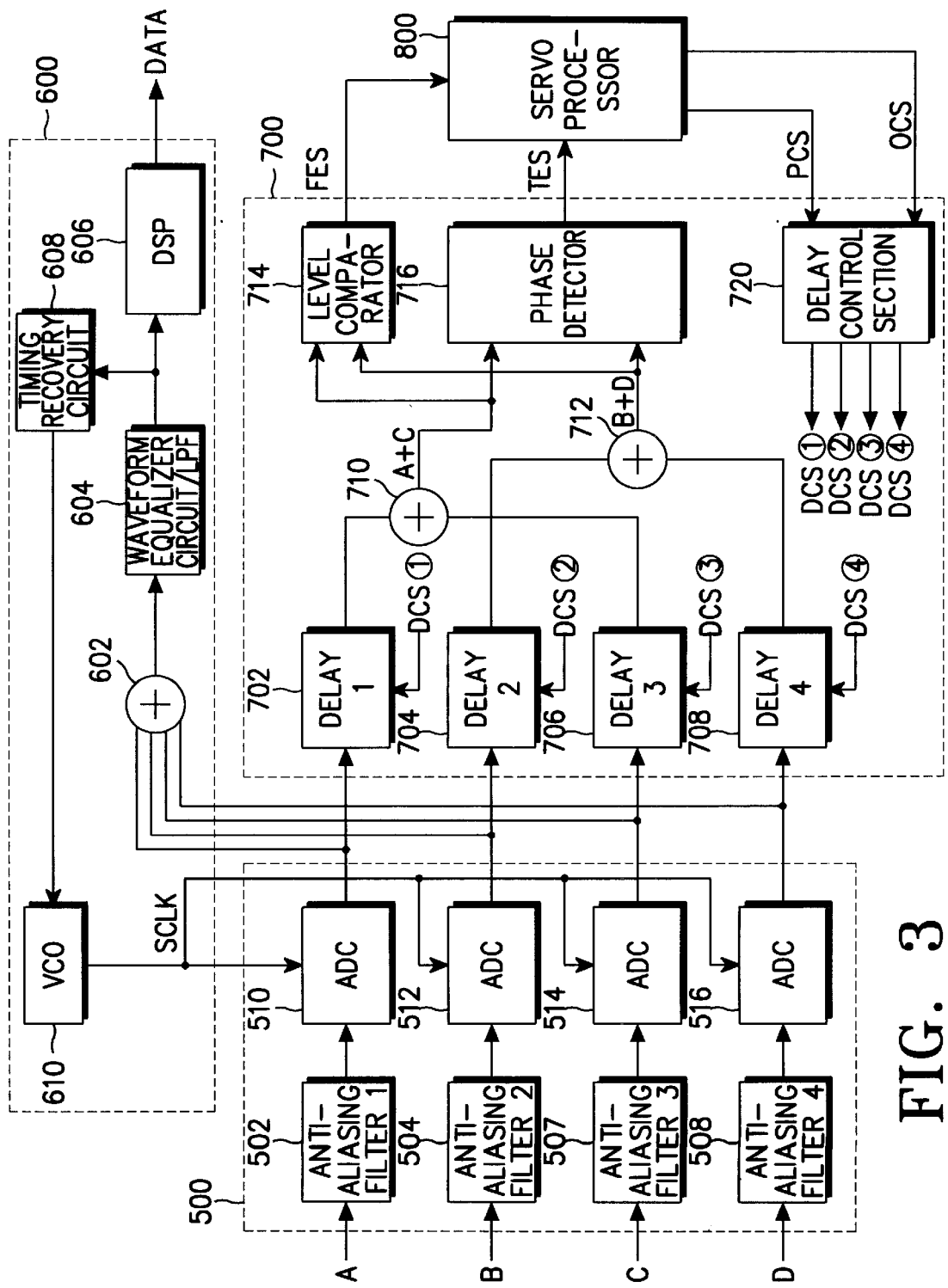
FIG. 3 is a circuit diagram of a read channel circuit according to a first embodiment of the present invention.

In FIG. 3, reference characters A to D designate channels through which reference and read signals picked-up by four-division photodiodes PDs (shown in FIG. 1) are transferred. The term "reference signal" herein means a signal for revising offset component of the circuit components of an optical disk reproducing apparatus, and may be applied by servo processor 800 or main processor during initializing operation of the optical disk reproducing apparatus. In other words, the offset component of the circuit components is revised after application of the reference signals, while the pit depth revision is achieved with the read signals when reproducing a data from an optical disk.

Next, operations to revise offset and pit depth of the circuit components are sequentially explained in connection with FIG. 3. First, as the driver power is supplied to the optical disk reproducing apparatus, the reference signals used to revise the offset of the circuit components are input to the channels A to D by servo processor 800 or main processor. Noise is then filtered from the reference signals by first to fourth anti-aliasing filters 502, 504, 506 and 508, which form one component of data converting section 500. Each of the noise-free reference signals A to D is sampled based on a sampling clock frequency signal and converted to a digital data. The digital data is input to a data reproducing section 600 and a servo error signal detecting section 700. The data reproducing section 600 detects the difference between the waveform-equalized reference signals and reference sampling points to generate a sampling clock frequency SCLK for compensating for the difference. The sampling clock frequency SCLK is output to the data converting section 500.

The servo error signal detecting section 700 generates delay control signals DCS1 to DCS4, in accordance with the phases specified by an offset revision control signal OCS and a pit depth revision control signal PCS, for delaying each signal input from the data converting section 500. After summing the delayed input signals to generate summed signals A+C and B+D, the servo error signal detecting section 700 generates a focusing error signal FES and a tracking error signal TES as a result of comparison between the level difference and the phase difference of the summed signals A+C and B+D. The focusing error signal FES and the tracking error signal TES are applied to the servo processor 800 to execute servo control. The servo processor 800 uses the tracking error signal TES to revise the offset component of the circuit components. The servo processor 800 generates the offset revision control signal OCS and the pit depth revision control signal PCS in order to minimize the tracking error signal TES. In particular, the servo processor 800 generates the offset revision control signal OCS to minimize (to zero) the phase difference between the summed signals A+C and B+D when the reference signals are input, while it generates the pit revision control signal PCS to minimize the phase difference when the read signals are input.

On the other hand, a delay control section 720 is receptive to the pit depth revision control signal PCS and the offset revision control signal OCS and generates delay control signals DCS1 to DCS4 used to delay the phases of the signals input from the data converting section 500. The delay control signals DCS1 to DCS4 are output to first to fourth delay circuits 702, 704, 706 and 708.

Next, operation of the servo error signal detecting section 700 described earlier is explained in detail. First, the reference signals A to D which are converted to digital signals by the data converting section 500 are summed by an adder 602 and undergo waveform-equalization and low-pass filtration at a digital waveform equalizer circuit/LPF 604 to be input to a timing recovery circuit 608 and a DSP 606. The timing recovery circuit 608 generates a controlling voltage (as a digital form in case of a digital phase-locked loop) based on the phase difference between the reference signals output from the waveform equalizer circuit/LPF 604 and the reference sampling points. A voltage-controlled oscillator 610 generates a sampling clock frequency SCLK whose frequency and phase are varied in correspondence to the level of the controlling voltage from the timing recovery circuit 608. A/D converters 510, 512, 514 and 516 of the data converting section 500 sample the reference signals based on the sampling clock frequency SCLK and convert them to a digital data. The DSP 606 has an embedded decision block and slices the low-pass filtered read signals to decide the logic values of "high" and "low" levels.

On the other hand, the reference signals A to D converted to digital signals by the data converting section 500 are provided to adders 710 and 712 via first to fourth delay circuits 702, 704, 706 and 708, respectively. Reference signals A and C, reference signals B and D are summed at the adder 710 and output to a level comparator 714 and a phase detector 716. The level comparator 714 generates a focusing error signal FES based on the level difference between the summed reference signals A+C and B+D, while the phase detector 716 generates a tracking error signal TES based on the phase difference between the reference signals A+C and B+D. The servo processor 800 outputs an offset revision control signal OCS used to minimize the tracking error signal TES. In response to the input of offset division control signal OCS, the delay control section 720 outputs delay-adjusted delay control signals DCS1 to DCS4 to minimize the phase difference between the summed signals A+C and B+D. The delay control signals DCS1 to DCS4 are applied to the first to fourth delay circuits 702, 704, 706 and 708, respectively, which delay the input signals based on by phases of the delay control signals DCS1 to DCS4.

Consequently, the phase difference between the signals A+C and B+D is reduced to the minimum and provides an effect to revise offset components of the circuit components in the lead channel circuit.

Next, an operation to revise pit depth of the mechanical components is explained. The signal processing operation for pit depth revision is analogous to that for offset revision with an exception of the signals input to the data converting section 500 and the pit depth revision control signal PCS output from the servo processor 800.

More specifically, the read signals A to D picked-up by four-division photo diodes PDs (shown in FIG. 1) during an optical disk reproducing operation are amplified as voltages at I/V amplifiers 102, 104, 106 and 108 and removed of noises at the data converting section 500. The noise-free read signals are converted to digital signals based on the sampling clock SCLK applied from the data reproducing section 600 and input to the servo error signal detecting section 700. The read signals are fed into adders 710 and 712 via first to fourth delay circuits 702, 704, 706 and 708, respectively, and output as signals A+C and B+D. The phase detecting section 716 generates a tracking error signal TES based on the phase difference between the read signals A+C and B+D. The servo processor 800 outputs a pit depth revision control signal PCS to minimize the tracking error signal TES. In response to the pit depth revision control signal PCS applied, the delay control section 720 outputs delay control signals DCS1 to DCS4 whose delays have been controlled so as to minimize the phase difference between the read signals A+C and B+D. The delay control signals DCS1 to DCS4 are applied to the first to fourth delay circuits 702, 704, 706 and 708, respectively, which delay and output the input signals as much as the phases of the delay control signals DCS1 to DCS4.

To sum up the above description, the delay control section 720 outputs delay control signals DCS1 to DCS4 which are based on the offset revision control signal OCS during initial system driving operation, or based on the pit depth revision control signal PCS during optical disk reproduction, thereby making it possible to minimize the offset component and the pit depth offset component caused by the construction of the circuit components.

Figure 4:
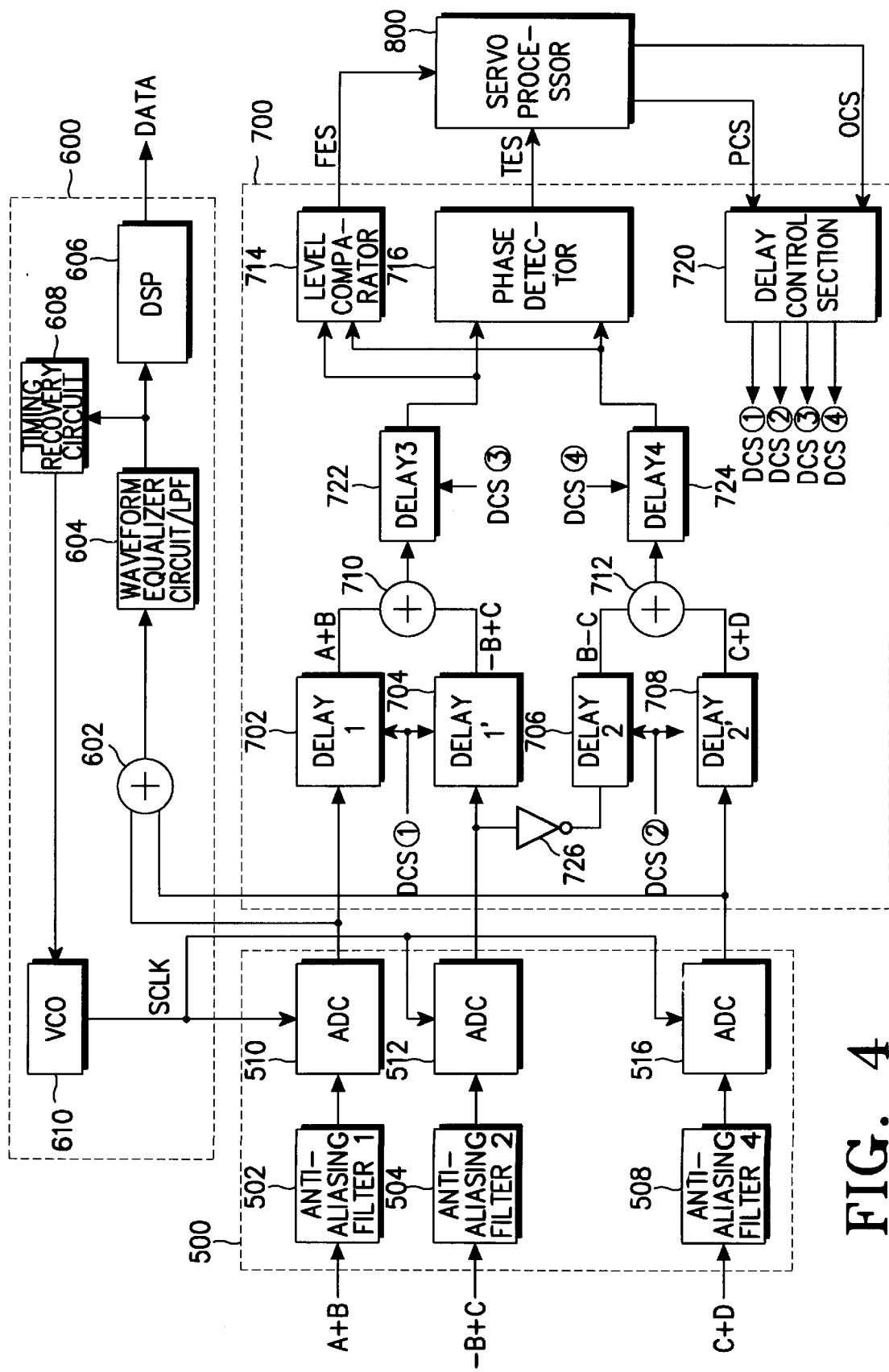
FIG. 4 is a circuit diagram of a read channel circuit according to second embodiment of the present invention.

The following description is the construction and operation of a read channel circuit according to a second embodiment of the present invention in connection with FIG. 4.

In connection with the second embodiment shown in FIG. 4, it is assumed that reference signals A to D to be used for offset revision are converted to the form of A+B, −B+C and C+D to be input to the data converting section 500. Noise is filtered from the reference signals A+B, −B+C and C+D by first, second and fourth anti-aliasing filters 502, 504 and 508. The noise-free reference signals A+B, −B+C and C+D are then converted to digital signals by A/D converters 510, 512, 516. The digital signals A+B and C+D are input to a data reproducing section 600 and used in data reproducing operation. Servo error signal detecting section 700 receives the digital signals A+B, −B+C and C+D, which are used to generate servo error signals TES and FES. The construction and operation of the data reproducing section 600 are analogous to those of the data reproducing section 600 shown in FIG. 3, and will be omitted in the following description. The servo error signal detecting section 700 is described in detail below. The signals A+B, -B+C and C+D output from the data converting section 500 and the signal B−C inverted at an inverter 726 are supplied to adders 710 and 712 via delay circuits 702, 704, 706 and 708, respectively. The adders 710 and 712 output summed signals A+C and B+D, which are applied to a level comparator 714 and a phase detector 716 via third and fourth delay circuits 722 and 724, respectively. The level comparator 714 generates a focusing error signal FES based on the level difference between the summed reference signals A+C and B+D, while the phase detector 716 generates a tracking error signal TES based on the phase difference between the read signals A+C and B+D. The servo processor 800 outputs an offset revision control signal OCS to minimize the tracking error signal TES. In response to the input of offset division control signal OCS, a delay control section 720 outputs delay-adjusted delay control signals DCS3 and DCS4 to minimize the phase difference between the signals A+C and B+D. The delay control signals DCS3 and DCS4 are applied to the third and fourth delay circuits 722 and 724, respectively, which delay and output the input signals as much as the phases of the delay control signals DCS3 and DCS4, thereby achieving removal of offset components caused by the circuit components.

To explain an operation to revise pit depth, first of all, read signals A to D picked-up by four-division photo diodes PDs (shown in FIG. 1) during an optical disk reproducing operation are summed as signals A+B, −B+C and C+D and input to the data converting section 500. First, second and fourth antialiasing-filters 502, 504 and 508 are filtered to remove noise. The noise-free signals A+B, −B+C and C+D are converted to digital signals based on the sampling clock SCLK applied from the data reproducing section 600 and input to the servo error signal detecting section 700. The read signals are supplied to adders 710 and 712 via delay circuits 702, 704, 706 and 708, respectively. The signals A+C and B+D are applied to the third and fourth delay circuits 722 and 724, to be delayed by the phases specified by the delay control signals DCS3 and DCS4, and input to the level comparator 714 and the phase detector 716, respectively. The phase detecting section 716 generates a tracking error signal TES based on the phase difference between the signals A+C and B+D. The servo processor 800 outputs a pit depth revision control signal PCS for mninimizing the tracking error signal TES. In response to the pit depth revision control signal PCS applied, the delay control section 720 outputs delay control signals DCS1 and DCS2 whose delays have been controlled so as to minimize the phase difference between the signals A+C and B+D. Thus the delay circuits 702, 704, 706 and 708 delay the input signals by the phases specified by the delay control signals. Accordingly, it is possible to revise offset components of the circuit and mechanical components that possibly occur during an optical disk reproduction.

In the present invention described above, detection of servo error signals is achieved by way of digital signal processing, which advantageously makes it possible to achieve accurate offset (pit depth) revisions of mechanical and circuit components to secure stability of servo control as well as to prevent distortion of signals caused by using analog signal processing in a data reproduction. Furthermore, a use of four-division photodiodes reduces the number of read channels used in the optical disk reproducing apparatus with a consequence of reduced power consumption.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A read channel circuit of an optical disk reproducing apparatus comprising a servo processor for generating an offset revision control signal and a pit depth revision control signal for minimizing tracking error signals, the read channel circuit comprising:

a data converting section for amplifying a plurality of input signals received via different channels and converting the reference signals to digital signals;

a data reproducing section for receiving the digital signals from the data converting section, summing and waveform-equalizing the digital signals to generate waveform-equalized signals, detecting a phase difference between the waveform-equalized signals and reference sampling points, and generating a sampling clock frequency which is supplied to the data converting section for compensating for the phase difference; and a servo error signal detecting section for receiving the digital signals from the data converting section, delaying the digital signals by phases specified by the offset revision control signal and the pit depth revision control signal to generate delayed signals, summing the delayed signals to generate summed signals, and generating the tracking error signals based on a comparison of phase differences between the summed signals.

2. The read channel circuit as claimed in claim 1, wherein the data converting section comprises:

a plurality of anti-aliasing filters for filtering noise from the input signals received through the different channels; and a plurality of analog-to-digital converters connected to the anti-aliasing filters for converting the reference signals to digital signals.

3. The read channel circuit as claimed in claim 1 or 2, wherein the servo error signal detecting section comprises:

a delay control section for generating delay control signals to delay the digital signals received from the data converting section by phases specified by the offset revision control signal and the pit depth revision control signal;

means for delaying the signals received from the data converting section in accordance with the delay control signals;

a plurality of adders for summing a predetermined number of the delayed signals output from the delaying means; and a phase detector for detecting a phase difference between summed signals output from the adders to generate the tracking error signals.

4. A read channel circuit of an optical disk reproducing apparatus comprising a plurality of division photodiodes for generating input signals A, B, C and D, and a servo processor for generating an offset revision control signal and a pit depth revision control signal for minimizing tracking error signals, the read channel circuit comprising:

a data converting section for receiving summed signals A+B, C+D and -B+C and converting the summed signals to digital signals A+B, C+D and −B+C;

a data reproducing section for receiving the digital signals A+B and C+D from the data converting section, generating a waveform-equalized signal by summing and waveform-equalizing the digital signals A+B and C+D, and detecting a phase difference between the waveform-equalized signal and a reference sampling point to generate a sampling clock frequency which is supplied to the data converting section for compensating for the phase difference; and a servo error signal detecting section for receiving the digital signals A+B, −B+C and C+D from the data converting section, generating first delayed signals by delaying the digital signals A+B, −B+C and C+D generated by the data converting section by phases specified by the pit depth revision control signal, generating summed first delay signals by summing the first delayed signals, generating second delayed signals by delaying the summed first delay signals by phases specified by the offset revision control signal, and generating the tracking error signals in based on a comparison of phase differences between the second delayed signals.

5. The read channel circuit as claimed in claim 4, wherein the data converting section comprises:

anti-aliasing filters for filtering noise from the summed signals A+B, -B+C and C+D; and analog-to-digital converters receiving the summed signals from the anti-aliasing filters and converting the summed signals to digital signals.

6. The read channel circuit as claimed in claim 4, wherein the servo error signal detecting section comprises:

a delay control section for generating an offset revision delay control signal and a pit depth revision delay control signal delayed as much as phases specified by the offset revision control signal and the pit depth revision control signal;

an inverter inverting the digital signal −B+C to generate a digital signal BC;

first delay means for generating the first delayed signals by delaying the digital signals A+B and C+D output from analog-to-digital converters and the digital signal B−C generated the inverter based on the pit depth revision delay control signal;

a plurality of adders for summing the first delayed signals generated by the first delay means to generate the summed first delayed signals A+C and B+D;

second delay means for generating the second delayed signals by delaying the summed first delayed signals A+C and B+D output from the adders in accordance with the offset revision delay control signal; and a phase detector for detecting phase differences between the second delayed signals output from the second delaying means to generate the tracking error signals.

7. The read channel circuit as claimed in claim 1, wherein the servo processor generates the offset revision control signal based on the tracking error signal generated by application of reference signals to the data converting section during an input of driver power, and generates the pit depth revision control signal based on the tracking error signal resulting from the signal read during an optical disk reproduction.

8. The read channel circuit as claimed in claim 4, wherein the servo processor generates an offset revision control signal based on the tracking error signal generated by application of reference signals to the data converting section during input of driver power, and generates the pit depth revision control signal based on the tracking error signal resulting from the signal read during an optical disk reproduction.

* * * * *